(12) United States Patent
Ishihara et al.

(10) Patent No.: US 6,764,527 B2
(45) Date of Patent: Jul. 20, 2004

(54) HONEYCOMB STRUCTURE CONSTITUTED BY MAIN AND SUB HONEYCOMB STRUCTURES

(75) Inventors: Mikio Ishihara, Kariya (JP); Mamoru Nishimura, Nagoya (JP)

(73) Assignee: Denso Corporation (JP)

( * ) Notice: Subject to any disclaimer, the term of this patent is extended or adjusted under 35 U.S.C. 154(b) by 88 days.

(21) Appl. No.: 10/062,475

(22) Filed: Feb. 5, 2002

(65) Prior Publication Data
US 2002/0108360 A1 Aug. 15, 2002

(30) Foreign Application Priority Data

Feb. 9, 2001 (JP) ........................................ 2001-034177
Aug. 7, 2001 (JP) ........................................ 2001-239685

(51) Int. Cl.[7] .............................................. B01D 50/00
(52) U.S. Cl. ............................ 55/485; 55/486; 55/489; 55/523; 210/335; 210/510.1; 428/116
(58) Field of Search ........................... 55/482–489, 523, 55/DIG. 30; 210/335, 488, 489, 510.1; 422/180; 428/116

(56) References Cited

U.S. PATENT DOCUMENTS

| | | | | |
|---|---|---|---|---|
| 3,358,427 A | * | 12/1967 | Bub ............................ | 55/484 |
| 3,675,394 A | * | 7/1972 | Sterrett ....................... | 96/133 |
| 3,909,224 A | * | 9/1975 | Spencer ...................... | 55/482 |
| 4,704,143 A | * | 11/1987 | Percy .......................... | 96/421 |
| 5,252,111 A | * | 10/1993 | Spencer et al. ............. | 55/489 |
| 6,464,744 B2 | * | 10/2002 | Cutler et al. ................ | 55/482 |

FOREIGN PATENT DOCUMENTS

JP            10-99624         4/1998

* cited by examiner

Primary Examiner—Joseph Drodge
(74) Attorney, Agent, or Firm—Nixon & Vanderhye PC

(57) ABSTRACT

A honeycomb structure comprising at least one main honeycomb structure 10 and sub-honeycomb structures 21, 22 axially disposed, in series, on both end surfaces of the main honeycomb structure 10. Partial plugs 15 are constituted for some of the cells 11 of the main honeycomb structure 10 by facing the intersecting portions of partitioning walls 211, surrounding the cells of the sub-honeycomb structure 21 disposed adjacent to the main honeycomb structure with some of the cells of main honeycomb structure, and the arrangement of the partial plugs 15 at one end surface 101 of the main honeycomb structure differs from that at the other end surface of the main honeycomb structure 10.

17 Claims, 7 Drawing Sheets ic # HONEYCOMB STRUCTURE CONSTITUTED BY MAIN AND SUB HONEYCOMB STRUCTURES

BACKGROUND OF THE INVENTION

1. Field of the Invention

The present invention relates to a honeycomb structure used for a filter for purifying an exhaust gas or the like.

2. Description of the Related Art

As means for removing particulate matters such as fine carbon particles and like particles emitted from an internal combustion engine such as of an automotive engine, there has been employed a method of once trapping particulate matters by using a honeycomb filter and removing the particulate matters by heating or burning them using a heater or a catalyst.

The conventional filter for purifying the exhaust gas employs a honeycomb structure in which, as shown in FIGS. 12 and 13, one end of cells 90 of the ceramic honeycomb structure 9, with both ends, are alternately closed with plugs 95. That is, referring to FIG. 13, the end surfaces 91 on the upstream side are alternately plugged, checkerwise, for example, by plugs 95 at the end of the cell 90. The cells having plugs on the upstream side are left open on their downstream side, and the cells which are opened on their upstream side are closed with plugs on the downstream side. A catalyst is carried on the partitioning walls 98, depending upon the kind of the filter for purifying the exhaust gas.

The above filter for purifying the exhaust gas traps the particulate matters on the partitioning walls thereof when an exhaust gas from an internal combustion engine passes therethrough, and the particulate matters are removed by being heated and burned using a heater or based upon the catalytic action.

However, the above-mentioned conventional filter 9 for purifying the exhaust gas has problems, as described below.

That is, as shown in FIG. 14, particulate matters 88 trapped from the exhaust gas 8 flowing into the exhaust-gas purifying filer are not necessarily removed by burning in good timing, so that they are often deposited gradually on the partitioning walls 98. For example, while the exhaust gas 8 of a low temperature is being emitted from the internal combustion engine, the burning does not take place despite the catalytic action, and the particulate matters 88 are simply deposited. In this case, the pressure loss increases when the exhaust gas 8 passes through the filter, i.e., through the honeycomb structure, and the filter is abnormally heated and may become cracked or melt-damaged by the heat of burning.

Further, the process of plugging cells of the honeycomb structure at the ends thereof requires very cumbersome and laborious manual work, hindering efforts to decrease the cost of production.

SUMMARY OF THE INVENTION

The present invention was accomplished in view of the problems inherent in the conventional art, and provides a honeycomb structure capable of suppressing the occurrence of excessive pressure loss caused by the deposition of particulate matters and of being produced at a decreased cost.

According to one aspect of the present invention, there is provided a honeycomb structure comprising at least one main honeycomb structure and sub-honeycomb structures axially disposed, in series, on both end surfaces of the main honeycomb structure, wherein partial plugs are constituted for some of the cells of the main honeycomb structure by facing the intersecting portions of partitioning walls, surrounding the cells of the sub-honeycomb structures disposed adjacent to the main honeycomb structure, with some of the cells of the main honeycomb structure and the arrangements of the partial plugs at one end surface of the main honeycomb structure differs from that at the other end surface of the main honeycomb structure.

The actions and effects of the invention will now be described.

As described above, the honeycomb structure of the present invention is constituted by combining the main honeycomb structure and the sub-honeycomb structures. The sub-honeycomb structures work as partial plugs for partially closing some cells of the main honeycomb structure. The partial plugs at the left end surface of the main honeycomb structure are arranged differently from those at the right end surface of the main honeycomb structure.

Therefore, the honeycomb structure has a construction such that the openings on one end of the cells of the main honeycomb structure, between both ends thereof, are at least partially closed by the partial plugs constituted by the sub-honeycomb structure. When the honeycomb structure is disposed in a fluid, therefore, as the fluid enters into the cells a difference occurs in the flow resistance of the fluid, depending upon the presence of the partial plugs, in the upstream end surface of the main honeycomb structure. Accordingly, the fluid easily enters into the cells without the partial plugs at the upstream end surface thereof.

In the cells having the partial plugs on the downstream end surface of the main honeycomb structure, a condition is established wherein a fluid encounters a smaller resistance, when it flows through a partitioning wall into a cell without a partial plug on the downstream side, than when it flows to the downstream side through the partial plugs on the downstream end surface of the main honeycomb structure. When the honeycomb structure is used, for example, for a filter for purifying an exhaust gas, the exhaust gas, which is the fluid, flows through the partitioning walls at a larger flow rate than when it flows through the main honeycomb structure without plugs, so that it is possible to trap the particulate matters in the exhaust gas by the partitioning walls with improved efficiency.

The plugs constituted by the sub-honeycomb structure are partial plugs which do not fully close the cells of the main honeycomb structure but only partially close them. This suppresses the problem, as explained above, that occurs when the cells are completely closed by the conventional plugs.

That is, when the cells are completely plugged, only a little of the fluid flows through the partitioning walls under an abnormal condition where the particulate matters have been excessively deposited on the partitioning walls, and the pressure in the cells rises excessively. According to the present invention, on the other hand, the cells of the main honeycomb structure are partially plugged, so that even in an abnormal condition where the pressure has been raised in the cells, the fluid flows through a space in a cell left by the partial plugs, and the pressure is not excessively elevated.

Further, the sub-honeycomb structure has the intersecting portions of the partitioning walls facing the cells of the main honeycomb structure to form the partial plugs. Therefore, no cumbersome production process needs to be executed, unlike the conventional plugging process. This makes it possible to produce the honeycomb structure at a decreased cost and more efficiently.

According to the present invention, therefore, it is possible to suppress the occurrence of excessive pressure loss caused by the deposition of particulate matters and to provide a honeycomb structure at a decreased cost.

According to another aspect of the present invention, it is preferable that the ratio of the total length of the sub-honeycomb structures in the axial direction thereof to the length of the whole honeycomb structure in the axial direction thereof, be in a range of from 5 to 60%. When the above ratio is less than 5%, the honeycomb structure has a decreased strength and may become cracked. When the ratio exceeds 60%, on the other hand, the main honeycomb structure possesses a decreased filtering area, so that it has considerably decreased capacity to trap the particulate matters.

According to a further aspect of the present invention, preferably, both the cells of the main honeycomb structure and the cells of the sub-honeycomb structures located at the ends of the main honeycomb structure, have a square shape and are arranged with their sides being inclined by about 45 degrees relative to each other and intersecting. In this case, the intersecting portions of partitioning walls of the sub-honeycomb structures can be regularly arranged relative to the cells of the main honeycomb structure, and hence the partial plugs can be regularly arranged. Therefore, an enhanced effect is obtained by the arrangement of the partial plugs.

According to a still further aspect of the present invention, it is preferable that the main honeycomb structure and the sub-honeycomb structures be joined together with an adhesive. In this case, the main honeycomb structure and the sub-honeycomb structures can be firmly secured together and deviation in the positional relationship between them can be prevented during the use.

According to a yet further aspect of the present invention, a casing is arranged to surround the honeycomb structure, and the arrangement of the main honeycomb structure and of the sub-honeycomb structures is secured by the casing. In this case, it is possible to omit the step of adhering the main honeycomb structure and the sub-honeycomb structures together, and thus to simplify the production process.

According to a still further aspect of the present invention, it is preferable that the main honeycomb structure be made of a ceramic material. As the main honeycomb structure, the partitioning walls thereof can be made of a metal or any other material as long as they can have permeability. Among them, a ceramic material is preferable, because it can easily realize the honeycomb structure having partitioning walls, with pores, exhibiting permeability.

The sub-honeycomb structures may be made of a ceramic material, a metal, etc.

According to another aspect of the present invention, it is preferable that the intersecting portions of partitioning walls of the sub-honeycomb structure have an increased thickness. In this case, the partial plugs exhibit an enhanced effect.

According to a further aspect of the present invention, there is provided a honeycomb structure in which a plurality of honeycomb structures are arranged in series, and partitioning walls of a first honeycomb structure are disposed so as to face at least some of the cells in a second honeycomb structure, and when a fluid flows in the direction in which the plurality of honeycomb structures are arranged in series, the flow resistance of the fluid in a passage formed by a cell defined by the partitioning walls in the second honeycomb structure located on the upstream side of the first honeycomb structure varies from a next passage formed by the adjacent cell, though all cells of the second honeycomb structure.

In the honeycomb structure of the present invention, each flow resistance of the fluid flowing through the cells in the honeycomb structure located on the upstream side is set to differ between two adjacent cells by the above-mentioned combination of the plurality of the honeycomb structures. Hence, a fluid entering into cells having high flow resistances flows through the partitioning walls into adjacent cells having low flow resistances. Therefore, a notable advantage is obtained when the above-mentioned honeycomb structure is used for the filter.

According to a further aspect of the present invention, there is provided a honeycomb structure in which a plurality of honeycomb structures are arranged in series, and partitioning walls of the first honeycomb structure are disposed so as to face at least some of the cells in the second honeycomb structure, and when a fluid flows in a direction in which the plurality of honeycomb structures are arranged in series, the density of cells of the second honeycomb structure located on the upstream side is higher than the density of cells of the first honeycomb structure located on the downstream side.

In the honeycomb structure of the present invention as described above, the density of cells in the honeycomb structure on the upstream side is higher than that of the honeycomb structure of the downstream side. Accordingly, the open surfaces of the cells of the honeycomb structure on the upstream side, which include the portions facing the partitioning walls of the honeycomb structure on the downstream side and the open portions, can be easily formed. It is therefore possible to set the flow resistance of the fluid flowing through a cell in the honeycomb structure located on the upstream side so as to differ from the adjacent cell thereof. Hence, the fluid entering into a cell having high flow resistance flows through the partitioning walls into the adjacent cells having low flow resistances. Therefore, a notable advantage is obtained when the above-mentioned honeycomb structure is used for the filter.

According to a further aspect of the present invention, the above-mentioned plurality of honeycomb structures can be arranged with a gap, which is not larger than 10 mm, between two adjacent honeycomb structures. When the gap exceeds 10 mm, the effect of adjusting the flow resistances between the adjacent cells on the upstream side is not achieved to a sufficient degree despite arranging the plurality of honeycomb structures in series.

DESCRIPTION OF THE PREFERRED EMBODIMENTS

Embodiment 1

The honeycomb structure according to an embodiment of the present invention will now be described with reference to FIGS. 1 to 4.

Figure 1:
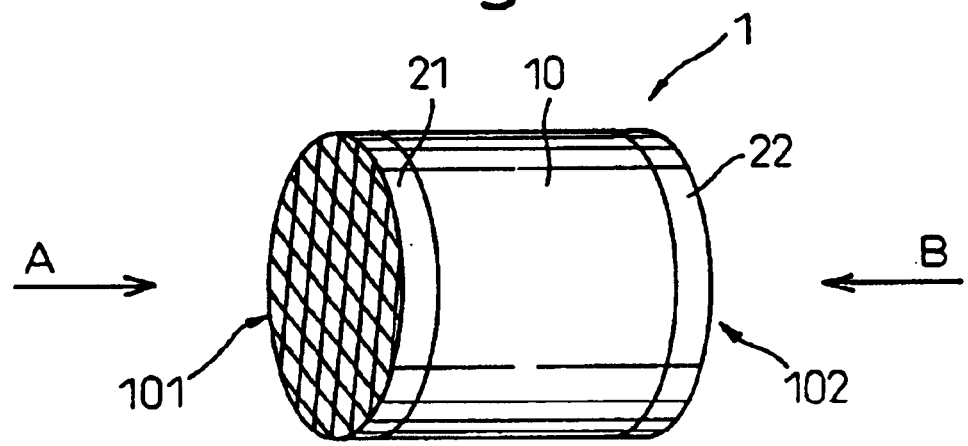
FIG. 1 is a perspective view of a honeycomb structure according to an embodiment 1.

Referring to FIG. 1, the honeycomb structure 1 of this embodiment includes a main honeycomb structure 10, and two sub-honeycomb structures 21 and 22 axially arranged in series on both end surfaces of the main honeycomb structure 10.

Figure 2:
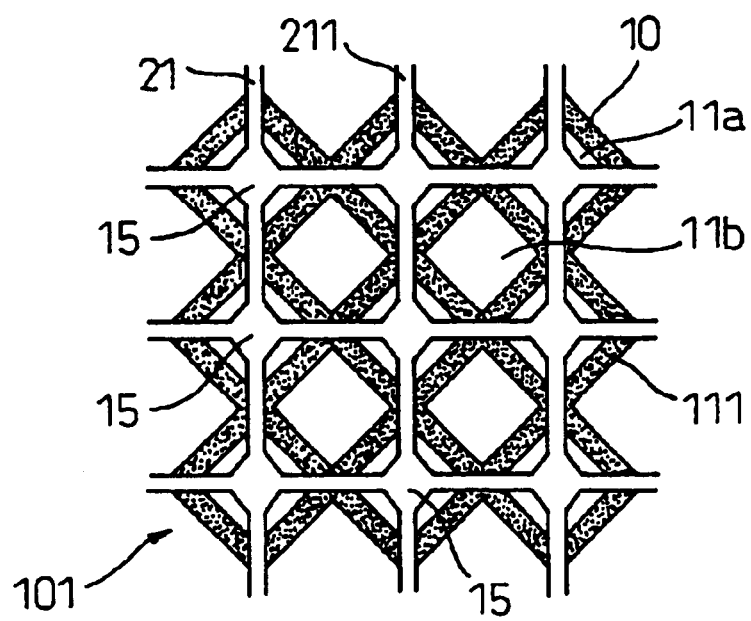
FIG. 2 is a diagram illustrating an end surface of the honeycomb structure according to embodiment 1 as viewed from the direction of an arrow A in FIG. 1.
Figure 3:
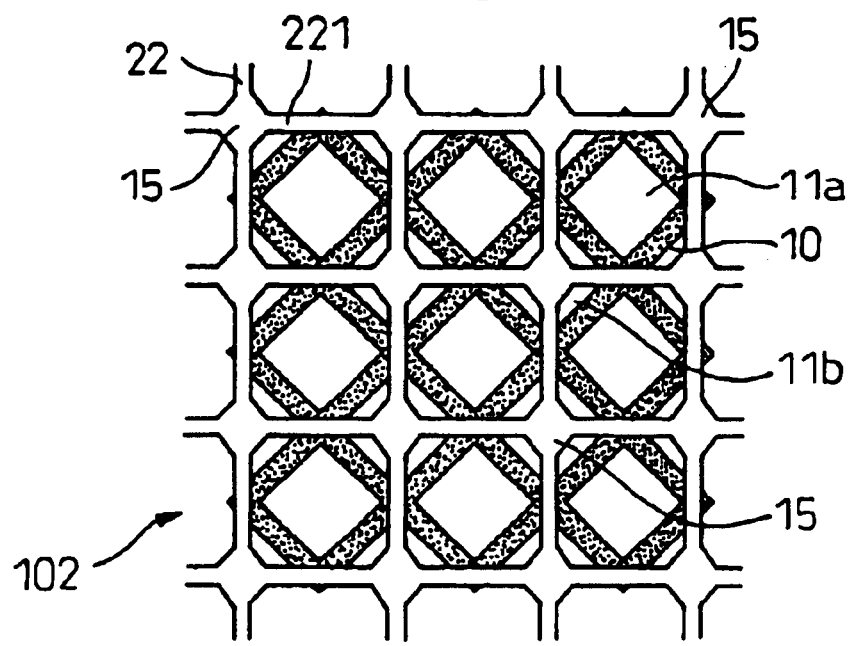
FIG. 3 is a diagram illustrating an end surface of the honeycomb structure according to embodiment 1 as viewed from the direction of an arrow B in FIG. 1.

Referring to FIGS. 2 and 3, intersecting portions of partitioning walls 211, 221, surrounding the cells of the sub-honeycomb structures 21, 22 disposed adjacent to the main honeycomb structure 21, 22, face some of the cells 11 of the main honeycomb structure 10 so as to constitute partial plugs 15. Here, the arrangement of the partial plugs 15 differs between the one end surface 101 and the other end surface 102 of the main honeycomb structure 10.

This will now be described in detail.

In this embodiment, the main honeycomb structure 10 and the sub-honeycomb structures 21, 22 have partitioning walls 111, 211, 221 in the shape of a square lattice as shown in FIGS. 2 and 3, and have many square cells. The honeycomb structures 10, 21, 22 are all made of a ceramic material chiefly comprising a cordierite. At least the partitioning walls 111 have a number of pores to maintain gas permeability.

The main honeycomb structure 10 and the sub-honeycomb structures 21, 22 all have outer sizes of 129 mm diameter. Further, the main honeycomb structure 10 has a length of 130 mm while the sub-honeycomb structures 21, 22 have a length of 10 mm, respectively, and the ratio of the total length of the sub-honeycomb structures 21, 22 in the axial direction thereof to the length of the whole honeycomb structure 1 in the axial direction thereof is made to be 13%.

The main honeycomb structure 10 has a cell size such that the partitioning wall is 0.3 mm thick and the cell pitch, i.e., the side of the cell, is 0.74 mm, and the diagonal line is 1.05 mm long. The sub-honeycomb structures 21, 22 have cell sizes such that the partitioning walls are 0.3 mm thick and the cell pitches (lengths of the sides) are 1.47 mm, respectively. That is, the cell pitch (length of the side) of the sub-honeycomb structures 21, 22 is selected to be the same as the pitch in the direction of the diagonal line (length of a diagonal line) of the main honeycomb structure 10.

In the sub-honeycomb structures 21, 22, further, the respective intersecting portions of the partitioning walls 211, 221 are thickened so as to thicken the cell corner portions as shown in FIGS. 2 and 3.

In this embodiment, further, the sub-honeycomb structures 21, 22 are joined to both axial end surfaces 101, 102 of the main honeycomb structure 10, respectively, by using an adhesive.

Here, as shown in FIGS. 2 and 3, the partitioning walls 111 of the main honeycomb structure 10 and the respective partitioning walls 211, 221 of the sub-honeycomb structures 21, 22 are arranged so as to intersect, being inclined each other by about 45 degrees.

As shown in FIGS. 2 and 3, further, the positions, on one end surface 101 of the main honeycomb structure 10, where the partial plugs 15 formed by the intersection of the partitioning walls 211 of the sub-honeycomb structure 21 are present, are different from the positions, on the other end surface 102 of the main honeycomb structure 10, where the partial plugs 15 formed by the intersection of the partitioning walls 221 of the sub-honeycomb structure 22 are situated, which means that the former positions are alternately arranged against the latter positions when both of the positions are in the same plane.

That is, the cells 11a having the partial plugs 15 on the one end surface 101 of the cell 11a as shown in FIG. 2 are opened, without the partial plugs 15, on the other end surface 102 thereof as shown in FIG. 3. On the other hand, the open cells 11b without the partial plugs 15, on one end surface 101 of the cells 11b as shown in FIG. 2 are provided with the partial cells 15 on the other end surface 102 thereof, as also shown in FIG. 3.

In this embodiment, the cells 11b of the main honeycomb structure 10 are closed by the partial plugs 15 at a ratio of about 85% in terms of the area.

Figure 4:
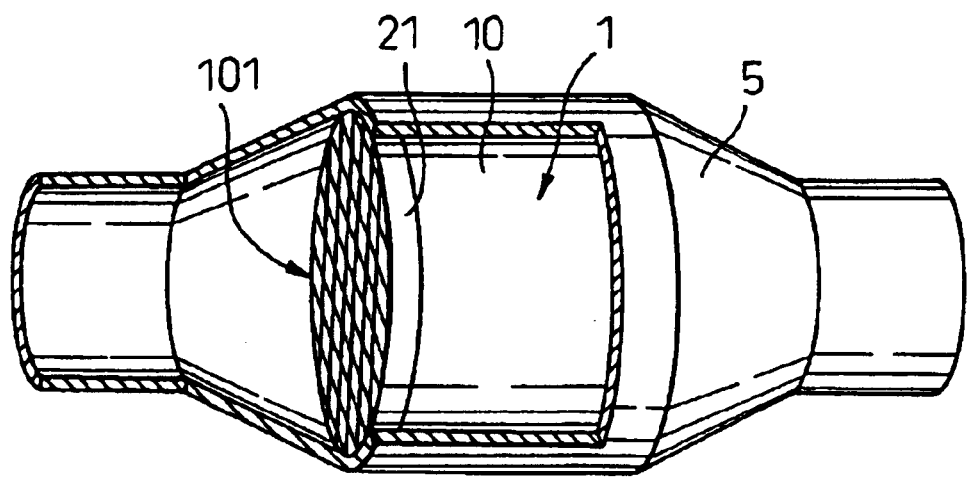
FIG. 4 is a view illustrating a filter for purifying the exhaust gas according to embodiment 1.

In this embodiment, the thus constituted honeycomb structure 1 is used as a carrier to constitute a filter for purifying the exhaust gas. Concretely speaking, as shown in FIG. 4, a catalyst is carried by the honeycomb structure 1 which is accommodated in a casing 5.

The following actions are exhibited when the filter employing the honeycomb structure 1 for purifying the exhaust gas is disposed in the exhaust gas passage.

That is, the exhaust gas colliding with one end surface 101 on the upstream side tends to selectively enter into the cells 11b (FIG. 2) without the partial plugs 15 due to the resistance produced by the partial plugs 15.

Further, the cells 11b have the partial plugs 15 on the downstream side as shown in FIG. 3, which creates a circumstance in that the fluid encounters lower resistance when it flows into the cells 11a without the partial plugs 15 on the downstream side through the partitioning walls 111 so as to flow out the cells 11a rather than when it flows to the downstream side through the partial plugs 15 on the downstream end surfaces of the cells 11b.

Therefore, when the above-mentioned honeycomb structure 1 is used as a carrier of the filter for purifying the exhaust gas, the exhaust gas, which is the fluid, passes through the partitioning walls 111 at an increased flow rate as compared to when only the main honeycomb structure 10 having no plug is used, so that the particulate matters contained in the exhaust gas can be trapped with improved efficiency.

The plugs constituted by the sub-honeycomb structures 21, 22 do not completely close the cells of the main honeycomb structure but are the partial plugs 15 for partially closing them. Under an abnormal condition where the particulate matters have been excessively deposited on the partitioning walls 111, the fluid passes through spaces in cells left by the partial plugs 15, and the pressure is not excessively elevated.

The sub-honeycomb structures 21 and 22 form the partial plugs with their intersecting portions of the partitioning walls 211, 221 facing the cells 11 of the main honeycomb structure 10. This eliminates a cumbersome of production process such as plugging employed in the prior art. Accordingly, the honeycomb structure 1 is produced at low cost and efficiently.

As described above, this embodiment provides a honeycomb structure 1 which suppresses the occurrence of excessive pressure loss caused by the deposition of particulate matters, and which can be produced at a low cost.

In this embodiment, the main honeycomb structure 10 and the sub-honeycomb structures 21, 22 are joined together with an adhesive. They may, however, be secured together by using the above-mentioned casing without using an adhesive.

Embodiment 2

Figure 5:
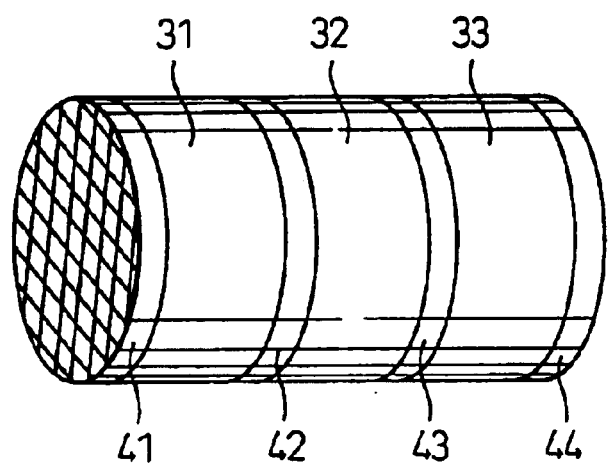
FIG. 5 is a perspective view of the honeycomb structure according to an embodiment 2.

In this embodiment as shown in FIG. 5, there are used a plurality of main honeycomb structures 31 to 33, and the main honeycomb structures 31 to 33 and the sub-honeycomb structures 41 to 44 are alternately arranged. The main honeycomb molded structures 31 to 33 are the same ceramic honeycomb structures as the main honeycomb structure 10 of the embodiment 1 with the exception of shortening the length thereof to 36 mm. The sub-honeycomb structures 41, 43 are the same as the sub-honeycomb structure 21 of the embodiment 1, and the sub-honeycomb structures 42, 44 are the same as the sub-honeycomb structure 22 of the embodiment 1. As shown in FIG. 5, they are arranged in series in the axial direction, and are adhered together with an adhesive. In other respects, this embodiment is the same as the embodiment 1.

In this case, the above-mentioned state of FIG. 2 and the state of FIG. 3 are alternately repeated due to the presence of the sub-honeycomb structures 41 to 44. When the honeycomb structure is used as a filter for purifying the exhaust gas in the same manner as in embodiment 1, therefore, the exhaust gas, which is the fluid, passes through the partitioning walls of the main honeycomb structures 31 to 33, i.e., passes through the partitioning walls three times. As a result, the particulate matters can be trapped with improved efficiency.

In other respects, the actions and effects are the same as those of the embodiment 1.

The above-mentioned embodiments have dealt with the cases where the main honeycomb structures and the sub-honeycomb structures possess square-shaped cells. However, as long as the above-mentioned partial plugs can be formed, the honeycomb structure may possess cells of any other shape, such as a triangular shape or a hexagonal shape.

Embodiment 3

Figure 6:
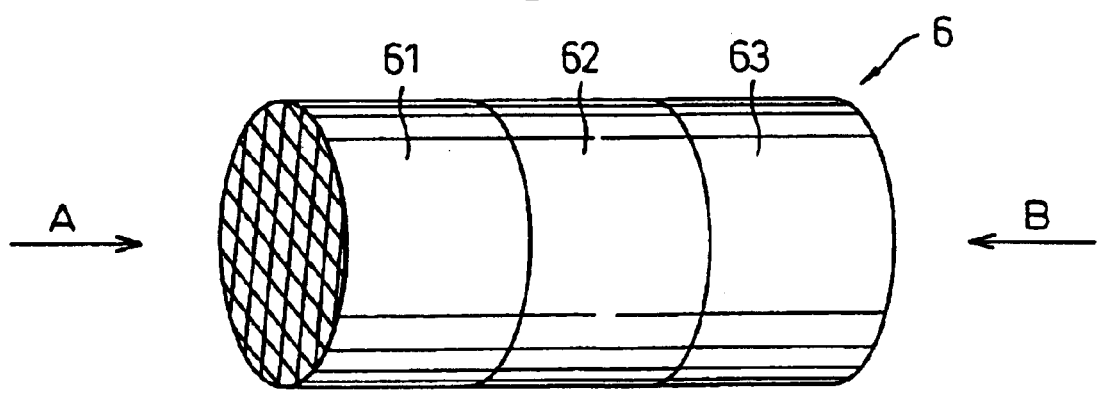
FIG. 6 is a perspective view of the honeycomb structure according to an embodiment 3.

The honeycomb structure 6 of this embodiment includes three honeycomb structures 61, 62 and 63 that are arranged in series as shown in FIG. 6. The two adjacent honeycomb structures are arranged so that the partitioning walls of one honeycomb structure face the openings of at least some of the cells of the other honeycomb structure.

When the fluid flows in the direction in which the three honeycomb structures 61, 62 and 63 are arranged in series, the honeycomb structure 61 located on the upstream side has a higher density of cells than the density of cells of the honeycomb structure 62 located on the downstream side and the honeycomb structure 62 located on the upstream side has a higher density of cells than the density of cells of the honeycomb structure 63 located on the downstream side.

Concretely speaking, the honeycomb structure 61 on the most upstream side has a density of cells of 900 meshes, the honeycomb structure 62 at the center has a density of cells of 600 meshes, and the honeycomb structure 63 on the most downstream side has a density of cells of 300 meshes.

Figure 7:
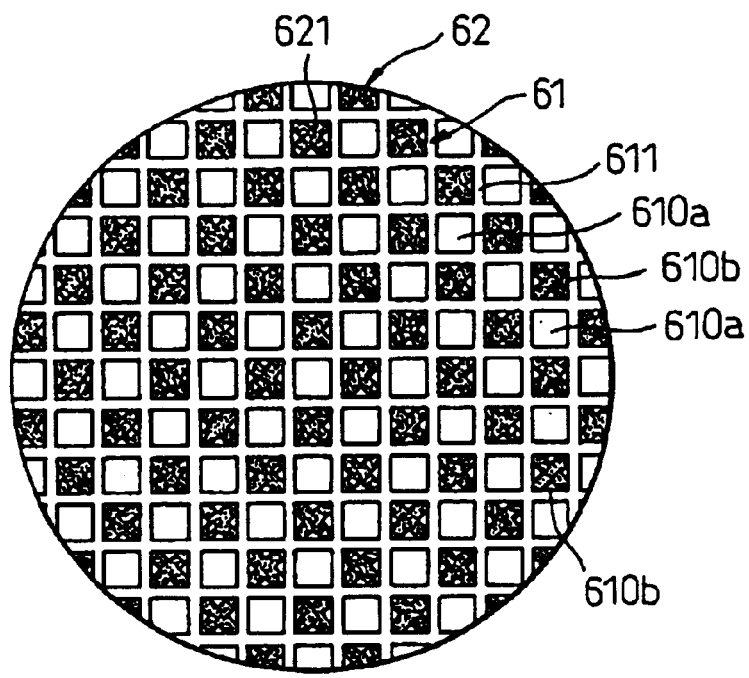
FIG. 7 is a diagram illustrating an end surface of the honeycomb structure according to embodiment 3 as viewed from the direction of an arrow A in FIG. 6.

FIG. 7 illustrates a state where the honeycomb structure 6 is viewed from the front on the upstream side (from the direction of an arrow A in FIG. 6). FIG. 7 illustrates the partitioning walls 611 of the honeycomb structure 61 on the most upstream side, and the partitioning walls 621 of the central honeycomb structure 62 located at the back thereof. The honeycomb structure 61 on the most upstream side has cells 610, which have closed cells 610b facing the partitioning walls of the central honeycomb structure 62 and open cells 610a, which are alternately arranged, in the open surface on the downstream side thereof.

Figure 8:
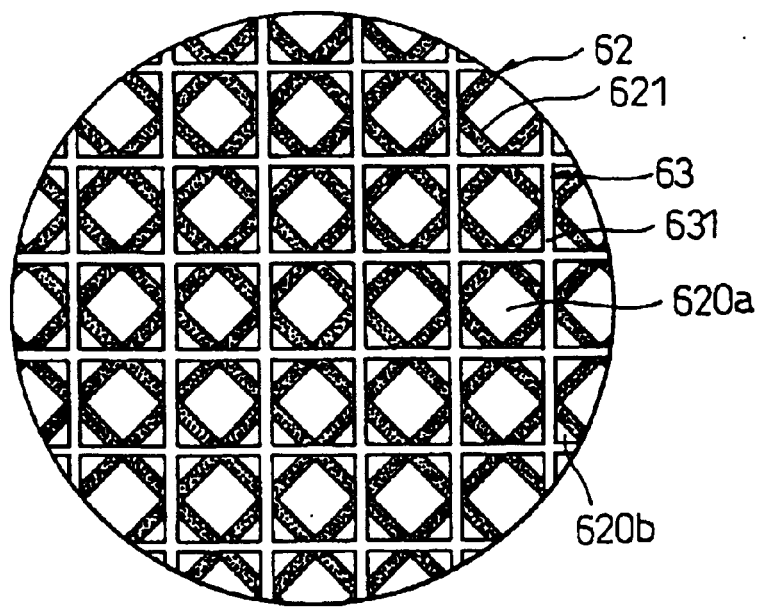
FIG. 8 is a diagram illustrating an end surface of the honeycomb structure according to embodiment 3 as viewed from the direction of an arrow B in FIG. 6.

FIG. 8 illustrates a state where the honeycomb structure 6 is viewed from the front on the downstream side (from the direction of an arrow B in FIG. 6). FIG. 8 illustrates the partitioning walls 631 of the honeycomb structure 63 on the most downstream side, and the partitioning walls 621 of the central honeycomb structure 62 located at the back thereof. The central honeycomb structure 62 has cells 620, which have closed cells 620b facing the partitioning walls 631 of the honeycomb structure 63 on the most downstream side and open cells 620a, which are alternately arranged, in the open surface on the downstream side thereof.

Figure 9:
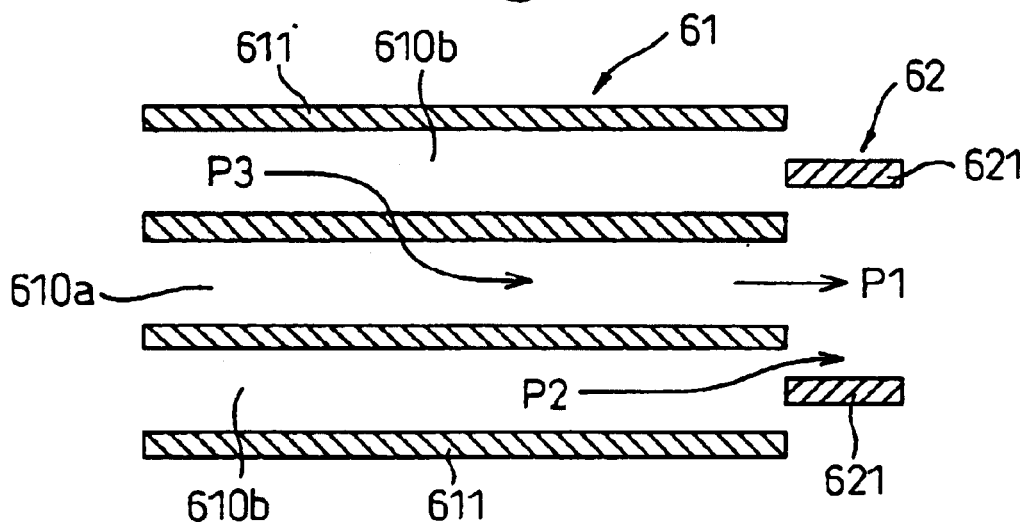
FIG. 9 is a diagram illustrating the flow resistance of a fluid according to embodiment 3.

FIG. 9 schematically illustrates a positional relationship between the partitioning walls 611 of the honeycomb structure 61 on the most upstream side and the partitioning walls 621 of the central honeycomb structure 62. In the cells 610 in the honeycomb structure 61 in FIG. 9, the flow resistance of the open cell 610a without the partitioning wall 621 of the honeycomb structure 62 in the open surface on the downstream side thereof is denoted by P1, the flow resistance of the closed cell 610b having the partitioning wall 621 of the honeycomb structure 62 disposed in the open surface on the downstream side thereof is denoted by P2, and the resistance created as the fluid flows from the closed cell 610b into the open cell 610a through the partitioning wall 611 is denoted by P3. Here, in this embodiment, there holds a relationship P1<P3<P2.

This permits the fluid flowing through the closed cell 610b to efficiently flow into the open cell 610a through the partitioning wall 611, to easily obtain excellent filtering effect through the partitioning wall 611.

Such an action and effect are similarly obtained even between the central honeycomb structure 62 and the downstream honeycomb structure 63; i.e., the honeycomb structure 6 as a whole exhibits two steps of excellent filtering effect.

Embodiment 4

Figure 10:
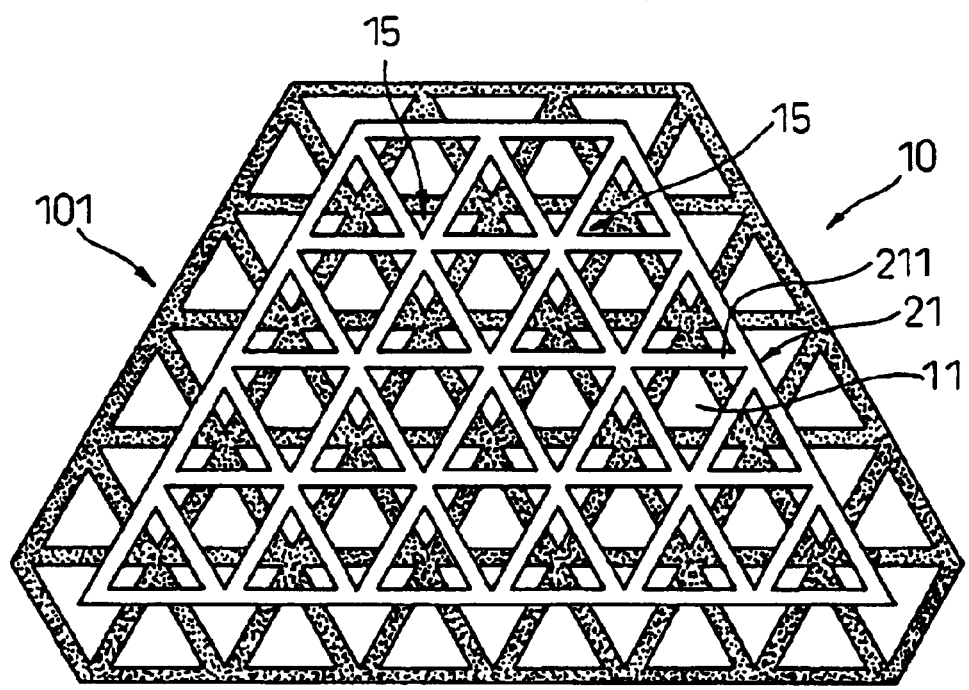
FIG. 10 is a diagram illustrating an end surface of the honeycomb structure according to an embodiment 4 as viewed from a direction corresponding to the direction of the arrow A in FIG. 1.
Figure 11:
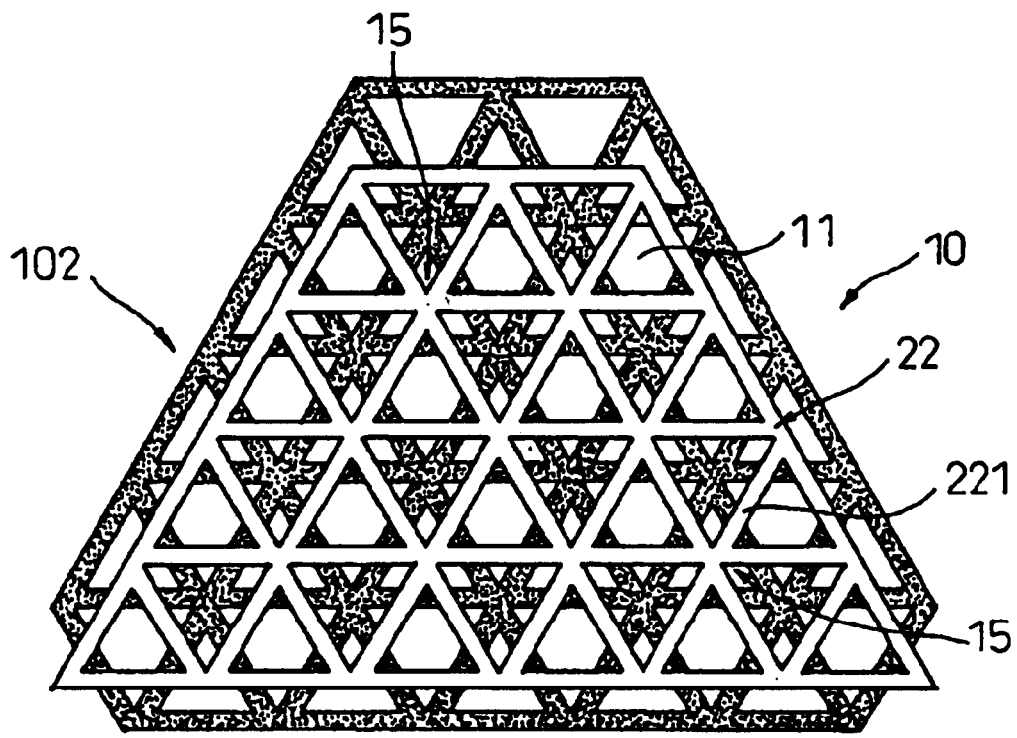
FIG. 11 is a diagram illustrating an end surface of the honeycomb structure according to embodiment 4 as viewed from a direction corresponding to the direction of the arrow B in FIG. 1.
Figure 12:
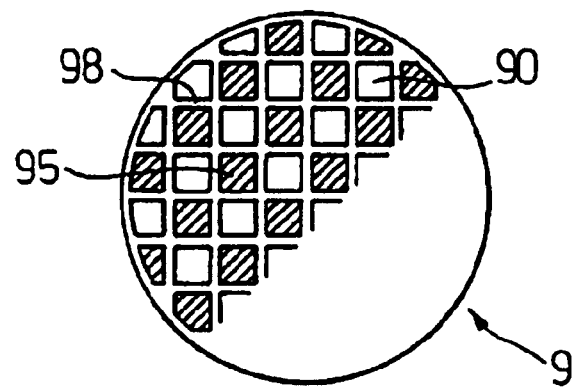
FIG. 12 is a diagram illustrating an end surface of the honeycomb structure according to a prior art.
Figure 13:
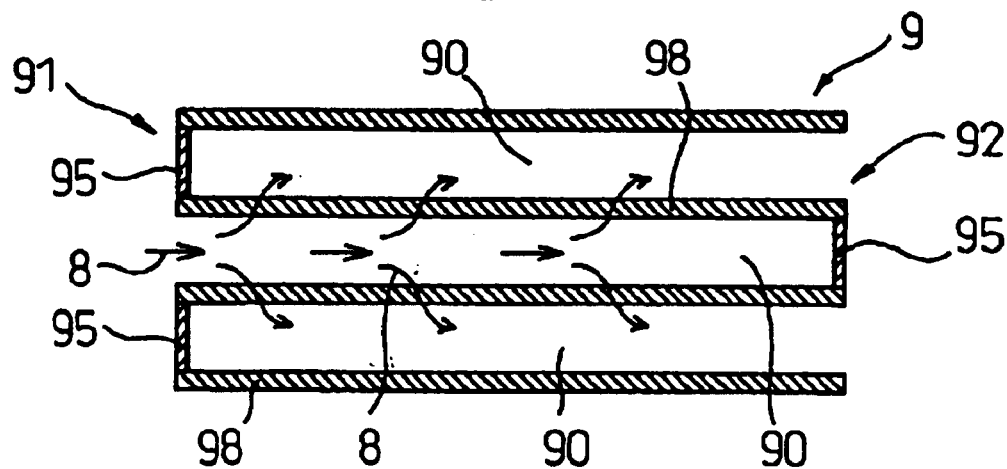
FIG. 13 is a diagram illustrating in longitudinal cross section the honeycomb structure according to the prior art.
Figure 14:
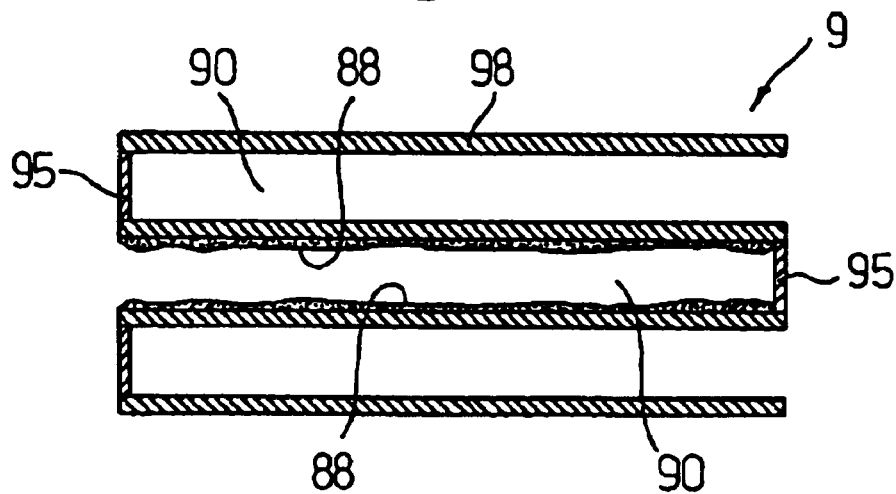
FIG. 14 is a diagram, illustrating a problem that occurs when the particulate matters deposit on the partitioning walls, in the prior art.

In this embodiment as shown in FIGS. 10 and 11, the shapes of the cells are changed in the main honeycomb structure 10 and in the two sub-honeycomb structures 21, 22, axially disposed, in series, on both ends of the main honeycomb structure 10, in the embodiment 1.

In this embodiment, the main honeycomb structure 10 as well as the sub-honeycomb structures 21, 22 have a triangular shape. As shown in FIGS. 10 and 11, partial plugs 15 are formed for some of the cells 11 of the main honeycomb structure 10 by facing the intersecting portions of the partitioning walls 211, 221, surrounding the cells of the sub-honeycomb structures 21, 22 adjacent to the main honeycomb structure 10, with the some of the cells 11 of the main honeycomb structure 10. Further, the arrangement of the partial plugs 15 at the one end surface 101 of the main honeycomb structure 10 differs from and the arrangement of the partial plugs 15 at the other end surface 102 of the main honeycomb structure 10.

In this embodiment, even the cells 11 without the partial plugs 15 face part of the partitioning walls 211, 221 of the sub-honeycomb structures 21, 22, which produces a flow resistance, to some extent, which, however, is sufficiently smaller than the flow resistance produced by the partial plugs 15 formed by the intersecting portions of the partitioning walls.

In other respects, this embodiment is the same as embodiment 1.

In this case, too, the same actions and effects are obtained as those of embodiment 1.

What is claimed is:

1. A honeycomb structure comprising;
    at least one main honeycomb structure and sub-honeycomb structures, each having cells, and said sub-honeycomb structures and in line axially disposed, in series, on both end surfaces of said main honeycomb structure the main honeycomb structure cells extending between said end surfaces;
    wherein partial plugs are constituted for some of the cells of said main honeycomb structure by facing the intersecting portions of partitioning walls, surrounding the cells of said sub-honeycomb structures disposed adjacent to the main honeycomb structure with the some of the cells of main honeycomb structure, and
    the arrangement of said partial plugs at one end surface of the main honeycomb structure differs from that at the other end surface of said main honeycomb structure.

2. A honeycomb structure according to claim 1, wherein there are a plurality of said main honeycomb structures and said main honeycomb structures and said sub-honeycomb structures are alternately arranged.

3. A honeycomb structure according to claim 1, wherein the ratio of the total length of said sub-honeycomb structures in the axial direction thereof to the length of the whole honeycomb structure in the axial direction thereof, is in a range of from 5 to 60%.

4. A honeycomb structure according to claim 1, wherein both the cells of said main honeycomb structure and the cells of said sub-honeycomb structures located at the ends of the main honeycomb structure have a square shape and are arranged with their sides being inclined by about 45 degrees relative to each other and being intersected.

5. A honeycomb structure according to claim 1, wherein said main honeycomb structure and said sub-honeycomb structures are joined together with an adhesive.

6. A honeycomb structure according to claim 1, wherein a casing is arranged to surround said honeycomb structure, and the arrangement of said main honeycomb structure and of said sub-honeycomb structures is secured by said casing.

7. A honeycomb structure according to claim 1, wherein said main honeycomb structure is made of a ceramic material.

8. A honeycomb structure according to claim 1, wherein the intersecting portions of partitioning walls of said sub-honeycomb structure have an increased thickness.

9. A honeycomb structure according to claim 1, wherein each said partial plug closes about 85% of the respective cell of the main honeycomb structure.

10. A honeycomb structure according to claim 1, wherein a catalyst is carried by at least one of said main honeycomb structure and said sub-honeycomb structures.

11. A honeycomb structure according to claim 1, wherein the cells of said main honeycomb and the cells of said sub-honeycomb structure are square-shaped.

12. A honeycomb structure, in which a plurality of honeycomb structures, each having cells extending from an upstream side to a downstream side of the structure are arranged in series, and partitioning walls of a first honeycomb structure are disposed so as to face at least some of the cells in a second honeycomb structure, and
    when a fluid flows in a direction in which said plurality of honeycomb structures are arranged in series, the flow resistance of the fluid in a fluid passage formed by a cell defined by the partitioning walls in the second honeycomb structure located on the upstream side of the first honeycomb structure varies from a next passage formed by the adjacent cell of the first honeycomb structure, through all cells of the second honeycomb structure.

13. A honeycomb structure according to claim 12, wherein
    in the cells in the second honeycomb structure, when the flow resistance of the open cell without the partitioning wall of the first honeycomb structure in the open surface on the downstream side thereof is denoted by P1, the flow resistance of the closed cell having the partitioning wall of the first honeycomb structure disposed in the open surface on the downstream side thereof is denoted by P2, and the flow resistance created as the fluid flows from said closed cell into said open cell through the partitioning wall is denoted by P3, there exists a relationship P1<P3<P2.

14. A honeycomb structure according to claim 12, wherein said plurality of honeycomb structures are arranged with a gap, which is not larger than 10 mm, between two adjacent honeycomb structures.

15. A honeycomb structure in which a plurality of honeycomb structures, each having cells extending from an upstream side to a downstream side of the structure are arranged in series, and partitioning walls of a first honeycomb structure are disposed so as to face at least some of the cells in a second honeycomb structure, and, when a fluid flows in a direction in which said plurality of honeycomb structures are arranged in series, the density of cells of the second honeycomb structure located on the upstream side is higher than the density of cells of the first honeycomb structure located on the downstream side.

16. A honeycomb structure according to claim 15, wherein
    in the cells in the second honeycomb structure, when the flow resistance of the open cell without the partitioning wall of the first honeycomb structure in the open surface on the downstream side thereof is denoted by P1, the flow resistance of the closed cell having the partitioning wall of the first honeycomb structure disposed in the open surface on the downstream side thereof is denoted by P2, and the flow resistance created as the fluid flows from said closed cell into said open cell through the partitioning wall is denoted by P3, there exists a relationship P1<P3<P2.

17. A honeycomb structure according to claim 15, wherein said plurality of honeycomb structures are arranged with a gap, which is not larger than 10 mm, between two adjacent honeycomb structures.

* * * * *